Patented Mar. 24, 1936

2,035,317

UNITED STATES PATENT OFFICE 2,035,317

5-ISOPROPYL-5-FUROMETHYL BARBITURIC ACID

Gustav Heilner, Berlin-Fichtengrund, Germany, assignor to the firm Chemische Fabriken Dr. Joachim Wiernik & Co., Aktiengesellschaft, Berlin-Waidmannslust, Germany No Drawing. Application January 27, 1934, Serial No. 708,694. In Germany February 1, 1933

1 Claim. (Cl. 260—33)

The present invention relates to the manufacture and production of the hitherto unknown C. C-disubstituted derivatives of the barbituric acid of the formula:

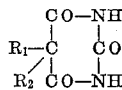

in which $R_1$ represents a furomethyl radicle having the formula

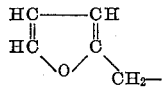

and $R_2$ the same or another unsaturated or saturated substituent as well as to the new compounds thus obtained and their utilization as hypnotics.

The new barbituric acid represents an excellent hypnotic, which is effective even in very small amounts, an average dose being 0.1 gram, and is free of undesired secondary effects. This fact is surprising since in contradistinction thereto ethyltetrahydrofuromethyl barbituric acid, even if applied in large quantities, has only a small effect.

The manufacture of the new compound is effected by introducing the isopropyl and furomethyl radicles into barbituric acid or by introducing into the barbituric acids carrying already one of said radicles the second radicle. The same purpose can also be obtained by starting from malonic acid or its derivatives, for instance cyanoacetic ester and introducing into the same the above-named radicles. Instead thereof it is also possible to introduce one of said radicles into the derivatives of the malonic acids already substituted by the other one and to convert the disubstituted compounds thus obtained to the barbituric acid derivatives by the methods known in the arts e. g. by condensation with urea.

The introduction of furomethyl radicles into barbituric acid or into their monosubstitution products is preferably obtained by treating the same with furomethyl halogenides. The introduction of the new radicles represents a reaction easily to be performed, in the most cases already at room temperature and also in an aqueous solution and even, if the furomethyl halogenide is diluted by an inert solvent. This behaviour could not be foreseen, since according to the present knowledge it must be expected that only simple aliphatic, unsaturated halogenides would react with salts of barbituric acid and their monosubstitution products in an aqueous solution under formation of C, C-disubstituted barbituric acids. The furan cycle possesses, it is true, unsaturated character. However, it resembles in its chemical behaviour much more the benzol cycle than an aliphatic unsaturated compound. For instance it is difficult to combine hydrogen with its double valencies. For this reason the furomethyl halogenides cannot be compared with a simple aliphatic, unsaturated halogenide.

In order to illustrate my new process more fully the following example is given the parts being in weight:

170 parts of isopropyl barbituric acid are dissolved in an aqueous solution containing 40 parts of sodium hydroxide and thoroughly stirred with 116 parts of furfuryl chloride. After a short time the new compound is precipitated. My new compound crystallizes from water in the shape of whitish needles, melting at 168–170° C. It easily dissolves in alcohol and forms salts with many metals, for instance alkali metals, the hydrogen of the NH-group being replaced by the metal.

The new compound represents the 5-isopropyl-5-furomethyl barbituric acid having the formula

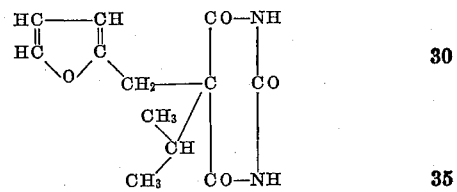

What I claim and desire to secure by Letters Patent of the United States is:

The herein described 5-isopropyl-5-furomethyl barbituric acid having the following formula

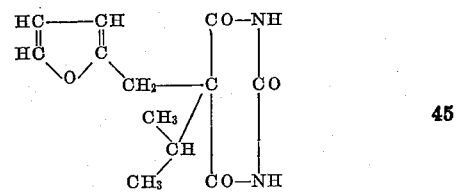

being whitish crystals soluble with difficulty in water, melting at 168–170° C. and being a valuable hypnotic.

GUSTAV HEILNER.